(12) United States Patent
Smith et al.

(10) Patent No.: US 7,750,792 B2
(45) Date of Patent: Jul. 6, 2010

(54) MULTI-MODE TAGS AND METHODS OF MAKING AND USING THE SAME

(75) Inventors: Patrick Smith, San Jose, CA (US); James Montague Cleeves, Redwood City, CA (US); Vikram Pavate, San Mateo, CA (US); Vivek Subramanian, Orinda, CA (US)

(73) Assignee: Kovio, Inc., Milpitas, CA (US)

( * ) Notice: Subject to any disclaimer, the term of this patent is extended or adjusted under 35 U.S.C. 154(b) by 0 days.

(21) Appl. No.: 11/870,775

(22) Filed: Oct. 11, 2007

(65) Prior Publication Data
US 2008/0088417 A1 Apr. 17, 2008

Related U.S. Application Data (60) Provisional application No. 60/851,122, filed on Oct. 11, 2006, provisional application No. 60/880,827, filed on Jan. 16, 2007.

(51) Int. Cl.
*H04Q 5/22* (2006.01)
(52) U.S. Cl. .................... 340/10.4; 340/10.5; 340/10.2; 340/10.3; 340/572.5; 340/572.7
(58) Field of Classification Search ................ 340/10.4, 340/10.1, 825.69, 825.72, 10.5, 10.2, 10.3, 340/572.5, 572.7, 572.8; 342/444, 445
See application file for complete search history.

(56) References Cited

U.S. PATENT DOCUMENTS

| 4,006,477 | A |   | 2/1977  | Yost, Jr. et al. |          |
|-----------|---|---|---------|------------------|----------|
| 4,223,830 | A |   | 9/1980  | Walton           |          |
| 5,479,172 | A | * | 12/1995 | Smith et al.     | 342/51   |
| 5,528,222 | A |   | 6/1996  | Moskowitz et al. |          |
| 5,541,604 | A |   | 7/1996  | Meier            |          |
| 5,682,143 | A |   | 10/1997 | Brady et al.     |          |
| 5,859,587 | A | * | 1/1999  | Alicot et al.    | 340/572.8|
| 5,912,632 | A |   | 6/1999  | Dieska et al.    |          |
| 5,945,920 | A | * | 8/1999  | Maletsky         | 340/10.52|
| 5,995,019 | A |   | 11/1999 | Chieu et al.     |          |
| 6,097,292 | A |   | 8/2000  | Kelly et al.     |          |

(Continued)

OTHER PUBLICATIONS

PCT International Preliminary Report on Patentability; PCT International Application No. PCT/US07/21938; Mailed Jan. 19, 2010; 8 pages; International Preliminary Examining Authority;US, Alexandria, Virginia.

*Primary Examiner*—Vernal U Brown
(74) *Attorney, Agent, or Firm*—The Law Offices of Andrew D. Fortney; Andrew D. Fortney (57) ABSTRACT

Multi-mode (e.g., EAS and RFID) tags and methods for making and using the same are disclosed. The tag generally includes an antenna, an electronic article surveillance (EAS) function block coupled to the antenna, and one or more identification function blocks coupled to the antenna in parallel with the EAS function block. The method of reading the tag generally includes the steps of applying an electric field to the tag, detecting the tag when the electric field has a relatively low power, and detecting an identification signal from the tag when the electric field has a relatively high power. The present invention advantageously enables a single tag to be used for both inventory and anti-theft purposes, thereby improving inventory management and control at reduced system and/or "per-article" costs.

30 Claims, 6 Drawing Sheets

U.S. PATENT DOCUMENTS

| | | |
|---|---|---|
| 6,100,804 A | 8/2000 | Brady et al. |
| 6,252,508 B1 * | 6/2001 | Vega et al. .............. 340/572.1 |
| 6,259,769 B1 | 7/2001 | Page et al. |
| 6,371,375 B1 | 4/2002 | Ackley et al. |
| 6,424,262 B2 | 7/2002 | Garber et al. |
| 6,480,101 B1 | 11/2002 | Kelly et al. |
| 6,509,217 B1 * | 1/2003 | Reddy ...................... 438/153 |
| 6,547,148 B2 | 4/2003 | Kelly et al. |
| 6,577,229 B1 | 6/2003 | Bonneau et al. |
| 6,801,787 B1 | 10/2004 | Page et al. |
| 7,148,804 B2 * | 12/2006 | Salesky et al. ........... 340/572.4 |
| 2004/0164302 A1 | 8/2004 | Arai et al. |
| 2005/0130389 A1 | 6/2005 | Yamazaki et al. |
| 2005/0133605 A1 | 6/2005 | Koyama et al. |
| 2005/0133790 A1 | 6/2005 | Kato |
| 2005/0134435 A1 | 6/2005 | Koyama et al. |
| 2005/0134463 A1 | 6/2005 | Yamazaki |
| 2005/0135181 A1 | 6/2005 | Shionoiri et al. |
| 2005/0174845 A1 | 8/2005 | Koyama et al. |
| 2005/0180187 A1 | 8/2005 | Koyama |
| 2005/0210302 A1 | 9/2005 | Kato et al. |

* cited by examiner

MULTI-MODE TAGS AND METHODS OF MAKING AND USING THE SAME

RELATED APPLICATIONS

This application claims the benefit of U.S. Provisional Application No. 60/851,122, filed Oct. 11, 2006, and U.S. Provisional Application No. 60/880,827, filed Jan. 16, 2007, both of which are incorporated herein by reference in their entireties.

FIELD OF THE INVENTION

The present invention generally relates to EAS (electronic article surveillance) and/or RFID (radio frequency identification) tags. More specifically, embodiments of the present invention pertain to multi-mode (e.g., "dual use" tags, having EAS and RFID functions thereon, for example) tags and methods for making and using the same.

DISCUSSION OF THE BACKGROUND

As is known in the art, EAS tags are useful for anti-theft detection, but generally do not store enough information for inventory control. On the other hand, RFID tags typically do not have an operational range sufficient for anti-theft uses, since they typically need to be within a short distance of the reader to obtain sufficient power to operate. It would be useful and/or desirable if a single tag could have both sufficient circuitry on-board for inventory control and/or "smart card" operations (e.g., auto toll tags, employee identification/security cards, etc.), while also having an EAS circuit with an operational range sufficient for compatibility with present EAS systems.

SUMMARY OF THE INVENTION

Embodiments of the present invention relate to dual use or multi-mode (e.g., EAS and RFID) identification tags and methods for making and using the same. The multi-mode identification tag generally comprises an antenna, an electronic article surveillance (EAS) function block coupled to the antenna, and one or more RFID function blocks coupled to the antenna in, thus enabling operation of the tag in both EAS and RFID modes. The invention may further relate to systems adapted to use multi-mode tags embodying one or more of the inventive concepts disclosed herein.

In various embodiments, the multi-mode tag comprises a rectifier coupled to the antenna in parallel with the EAS function block, and optionally, with the RFID block as a whole. Alternatively, when the multi-mode tag comprises multiple RFID function blocks, the rectifier may be coupled to the antenna in series with at least two of the RFID function blocks. The rectifier generally receives a signal having a characteristic frequency (e.g., a characteristic radio frequency) from the antenna and provides upper and lower power supplies to the RFID function block(s).

In certain embodiments, the rectifier comprises a first path comprising a first diode coupled between a first AC signal from the antenna and a first power supply output to the RFID function block(s), and a second path comprising a second diode coupled between a second AC signal from the antenna complementary to the first AC signal and the first power supply. In further embodiments, the rectifier further comprises a third path comprising a third diode coupled between a second power supply output to the RFID function block(s) complementary to the first power supply and the first AC signal, and a fourth path comprising a fourth diode coupled between the second power supply and the second AC signal. In certain preferred arrangements, each of the first and second paths (and when present, each of the third and fourth paths) comprises a pair of diodes in series.

In certain embodiments, the rectifier includes a resonating circuit with a load effective to reduce the Q of the tag. In various implementations, the resonating circuit may include a programmable threshold device or a device having a turn-on threshold sufficiently high to delay a transition from the high-Q state to the low-Q state, thereby preventing the tag from transitioning into the low-Q state at a low voltage. For example, the turn-on threshold of the high turn-on threshold device may be above an EAS read threshold, thereby enabling the tag from being detectable as an EAS tag. In either the programmable or high turn-on threshold case, the device generally comprises a transistor.

The programmable threshold device may comprise a transistor programmed to have a threshold sufficiently low to maintain the tag in a low Q state until the tag is removed from an electric field. In other embodiments, the programmable threshold device may have a size such that, in a high power electric field, the rectifier supplies sufficient power for the tag to communicate with the reader. Alternatively or additionally, the multi-mode tag may comprise logic configured to change the threshold of the programmable threshold device to a relatively high value so that the antenna enters a high Q state (e.g., to turn on the EAS).

In other embodiments, the multi-mode identification tag has (i) a high Q state in an electric field having a relatively low power and (ii) a low Q state in an electric field having a relatively high power. For example, the antenna may comprise a nonlinear magnetic material having a relatively low loading in an electric field having a relatively low power and a relatively high loading in an electric field having a relatively high power, the relatively high and low loadings being effective to provide the tag with the high Q state at the relatively low power and the low Q state at the relatively high power. In another aspect, the tag has the high Q state when the power of the electric field is below a first threshold and the low Q state when the power of the electric field is above a second threshold, the second threshold being greater than or equal to the first threshold.

In one implementation, the rectifier is substantially non-operational or disabled when the tag has the high Q state, but is operational or enabled when the tag has the low Q state. In another implementation, the RFID function block(s) are substantially non-operational, disabled or electrically disconnected from a power supply when the tag has the high Q state, and the RFID function block(s) are substantially operational, enabled or electrically connected to the power supply when the tag has the low Q state. Optionally, when the tag is in an electric field having a power above a first predetermined threshold, a sufficient number of the RFID function block(s) are enabled or electrically connected to the power supply to lower the Q of the tag to the low Q state. Alternatively or additionally, when the power of the electric field is below a second predetermined threshold, a sufficient number of the RFID function block(s) are disabled or electrically disconnected from the power supply to maintain the Q of the tag in the high Q state. In this latter case, the second predetermined threshold is less than or equal to the first predetermined threshold.

The RFID function block(s) in the present multi-mode identification tag may comprise a demodulator or clock extractor configured to receive a signal from the antenna and provide a clock signal to remaining RFID function block(s) in response thereto; logic configured to receive the clock signal from the demodulator or clock extractor and provide an identification signal in response thereto; and/or a modulator or output stage configured to transmit the identification signal or a modulated identification signal to the antenna. The logic may comprise a memory storing a bit string, and the identification signal may comprise the bit string. In a further embodiment, the logic may be configured to silence the tag for a period of time and re-transmit the bit string thereafter.

The EAS function block in the present multi-mode identification tag may comprise a capacitor. In general, the capacitor has a predetermined breakdown voltage. Furthermore, the antenna in the present multi-mode identification tag may comprise a coil (similar to conventional EAS and/or RFID tags) and a tuning element. The tuning element may comprise a second coil, a capacitor or capacitor plate, or a tuning ring.

The method of reading an identification tag generally comprises applying an electric field to the tag, detecting the tag when the electric field has a relatively low power, and detecting an identification signal from the tag when the electric field has a relatively high power. In the present method, the electric field is typically generated by a tag reader. Thus, the present method may further comprise generating a pulse from the reader to increase the power of the electric field over a period of time sufficiently short to maintain a legal or compliant average power (i.e., below national and/or international standards for electromagnetic interference [EMI]). In addition, the pulse should have a length sufficient for the reader to sense the tag if it is present in the electric field.

In one embodiment of the method, as for the tag itself, the tag includes an tag having a high Q state when the power of the electric field is below a first threshold and a low Q state when the power of the electric field is above a second threshold, the second threshold being greater than or equal to the first threshold. Accordingly, in the present method, the tag may comprise a rectifier that is substantially non-operational or disabled when the tag has the high Q state, and the rectifier is operational or enabled when the tag has the low Q state. Alternatively or additionally, the tag may comprise one or more RFID function block(s) that are substantially non-operational, disabled or electrically disconnected from a power supply when the tag has the high Q state, and the RFID function block(s) are substantially operational, enabled or electrically connected to the power supply when the tag has the low Q state.

In certain embodiments, when the power of the electric field is above a first predetermined threshold, a sufficient number of the RFID function block(s) are enabled or electrically connected to the power supply to lower the Q of the tag to the low Q state. Alternatively or additionally, when the power of the electric field is below a second predetermined threshold, a sufficient number of the RFID function block(s) are disabled or electrically disconnected from the power supply to maintain the Q of the tag in the high Q state, the second predetermined threshold being less than or equal to the first predetermined threshold.

The present invention advantageously provides a tag that provides both an EAS function and a RFID function. Thus, the tag is useful as an RFID tag, both before and after the EAS function is disabled. As a result, manufacturers, wholesalers, distributors and retailers can use a single tag for RF and EAS functions, thereby simplifying product and inventory management and potentially reducing the costs of performing and/or providing both functions.

These and other advantages of the present invention will become readily apparent from the detailed description of preferred embodiments below.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of processes, procedures, logic blocks, functional blocks, processing, and other symbolic representations of operations on code, data bits, data streams or waveforms within a computer, processor, controller and/or memory. These descriptions and representations are generally used by those skilled in the data processing arts to effectively convey the substance of their work to others skilled in the art. A process, procedure, logic block, function, process, etc., is herein, and is generally, considered to be a self-consistent sequence of steps or instructions (or circuitry configured to perform or execute the same) leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like, and to their representations in computer programs or software as code (which may be object code, source code or binary code).

It should be borne in mind, however, that all of these and similar terms are associated with the appropriate physical quantities and/or signals, and are merely convenient labels applied to these quantities and/or signals. Unless specifically stated otherwise and/or as is apparent from the following discussions, throughout the present application, discussions utilizing terms such as "processing," "operating," "computing," "calculating," "determining," "manipulating," "transforming" or the like, refer to the action and processes of a computer or data processing system, or similar processing device (e.g., an electrical, optical, or quantum computing or processing device or circuit), that manipulates and transforms data represented as physical (e.g., electronic) quantities. The terms refer to actions and processes of the processing devices that manipulate or transform physical quantities within the component(s) of a circuit, system or architecture (e.g., registers, memories, other such information storage, transmission or display devices, etc.) into other data similarly represented as physical quantities within other components of the same or a different system or architecture.

Furthermore, in the context of this application, the terms "wire," "wiring," "line," "signal," "conductor" and "bus" refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Similarly, for convenience and simplicity, the terms "clock," "time," "timing," "rate," "period" and "frequency" are, in general, interchangeable and may be used interchangeably herein, but are generally given their art-recognized meanings. Also, for convenience and simplicity, the terms "data," "data stream," "bits," "bit string," "waveform" and "information" may be used interchangeably, as may the terms "connected to," "coupled with," "coupled to," and "in communication with" (which may refer to direct or indirect connections, couplings, or communications), but these terms are generally given their art-recognized meanings herein. Further, a "tag" may refer to a single device or to a sheet and/or a spool comprising a plurality of attached structures, suitable for electronic article surveillance (EAS), high frequency (HF), ultrahigh frequency (UHF), radio frequency (RF) and/or RF identification (RFID) purposes and/or applications.

Embodiments of the present invention advantageously provide an identification tag that has both EAS and RFID functions. Thus, the tag is useful as an RFID tag, before (and optionally, after) the EAS function is disabled. As a result, manufacturers, wholesalers, distributors and retailers can use a single tag for RF and EAS functions, thereby simplifying product and inventory management and potentially reducing the costs of performing and/or providing both functions. However, in some embodiments, both RFID and EAS functions can be disabled by simply deactivating the EAS block.

The invention, in its various aspects, will be explained in greater detail below with regard to exemplary embodiments.

An Exemplary Multi-Mode Identification Tag

In one aspect, the present invention concerns a multi-mode identification tag. The tag generally comprises an antenna, an electronic article surveillance (EAS) function block coupled to the antenna, and one or more RFID function blocks coupled to the antenna in parallel with the EAS function block. Thus, in one respect, the invention relates to a combination RFID/EAS product which incorporates RFID functionality while retaining interoperability with EAS anti-theft systems. The dual mode RFID/EAS tag uses the basic functionality of an RFID chip, but may operate the tag at 8.2 MHz, rather than at 13.56 MHz. On-chip capacitance may provide the LC tuning necessary for resonance at 8.2 MHz. As a result, the present dual mode RFID/EAS tag does not require a separate external capacitor or coil.

Figure 1:
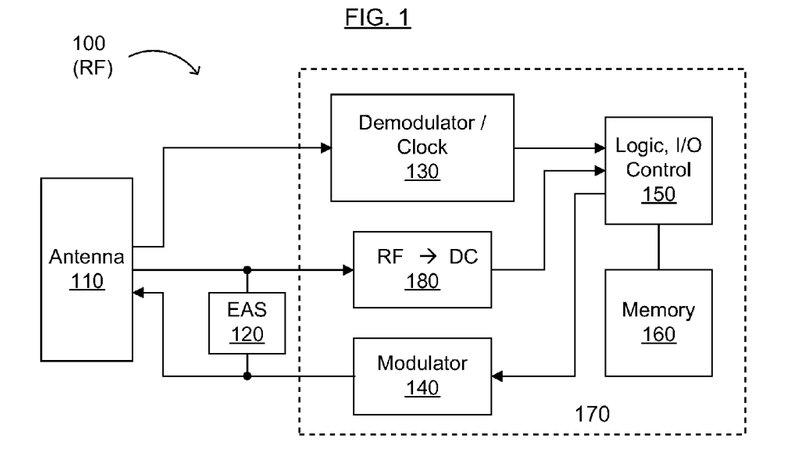
FIG. 1 is a block diagram showing a first embodiment of the present multi-mode identification tag.

FIG. 1 shows a first exemplary embodiment of a suitable dual-mode tag architecture 100. The architecture 100 includes an antenna 110, an EAS function block 120, and an RFID portion 170 (e.g., as described in U.S. patent application Ser. Nos. 11/544,366 and 11/595,839, filed on Oct. 6, 2006 and Nov. 8, 2006, respectively, the relevant portions of which are incorporated herein by reference). The EAS function block 120 is coupled to the antenna 110 in parallel with part or all of the RFID block 170 (e.g., RF→DC rectifier block 180, logic 150, and modulator 140, which may be in series as shown in FIG. 1). /In one embodiment, the EAS function block may comprise a linear and/or non-linear capacitor, as described in U.S. Pat. No. 7,152,804 and/or U.S. patent application Ser. No. 11/104,375, filed Apr. 11, 2005, the relevant portions of which are incorporated herein by reference. Each of the functional blocks in FIG. 1 is largely known in the art, and unless otherwise described or claimed herein, is as known in the art.

In further embodiments, RFID block 170 may further comprise a demodulator/clock generator block 130 (e.g., in parallel with the rectifier 180) and/or memory 160 (which may contain programming and/or configuration information for logic and/or I/O control block 150). In alternative embodiments, RF→DC rectifier block 180 can be substituted by a very high frequency (VHF)→DC rectifier block or an ultrahigh frequency (UHF)→DC rectifier block (see, e.g., U.S. patent application Ser. Nos. 11/595,839 and 11/544,366, the relevant portions of which are incorporated herein by reference).

The dual use tag 100 (e.g., having properties and/or characteristics sufficient for use in both EAS and RFID applications) may be designed to have a high Q when the applied power is low and the rectifier is not functional. The high Q (e.g., a property of the antenna 110) provides detection ranges of several feet or more and thereby allows the corresponding EAS reader to sense that there is a tag in its field, but the reader will generally not have enough power to turn on the tag to send data. The Q of the tag may then decrease when the power is high, because the extra load of the rectifier 180 may increase the losses in the system and thereby lower the Q. Thus, the dual use tag 100 may have a high Q and a substantially non-operational or disabled rectifier 180 in an applied field below a particular power threshold, and a low Q and an operational or enabled rectifier 180 in an applied field above the threshold. The threshold may be selected such that, for example, the EAS functionality operates at a range of up to several feet (e.g. at least one foot and preferably up to 4 or 5 feet), while the RFID functionality may operate at a range of at most about one foot.

Reducing the Q of the tag's inductor may be achieved by using nonlinear magnetic materials in the antenna 110 that show enhanced loading at higher incident powers, such that losses generally increase with increasing power. This approach effectively lowers the Q of the tag at a high power, such as is generally used in RFID mode, relative to the Q at a low power, such as is generally used in EAS mode. An alternate method of altering the Q of the tag makes use of switching on portions of the RFID tag circuitry 170 (e.g., rectifier 180, demodulator/clock 130, etc.) at high incident RF powers to increase the current draw of the circuit, hence degrading the Q of the tag. These circuits could be designed to stay off at low incident powers, thus ensuring a high-Q during EAS mode operation of the tag.

The high Q state allows the tag to be read from a distance large enough for the tag to be useful as an EAS device. The applied power in such a case may be moderately high compared to the available maximum set by the FCC, but signal pulsing may be used by the reader to increase the power over a proportionately short time, while maintaining a legal or compliant average power. Since the tag is generally not powering up in the high Q state or EAS mode (e.g., the rectifier is not operational), the pulse can be short, just long enough to sense if there is a tag present. Also, in the EAS mode, the tag is usually a relatively long distance away from the reader (e.g., >1 foot), so that even though the reader power may be relatively high, the power the tag sees is low so it stays in the high Q mode and is not disabled by the reader, even if signal pulsing is not used. In contrast, the low Q state may be used within a few centimeters of a reader (e.g., <5 cm), as is typical of the checkout counter environment (e.g., the RFID mode). The low Q in the RFID mode may not matter (e.g., for signal reception purposes) because the power available is relatively high due to the short distance to the reader, although at sufficiently short distances, a low Q may be desirable (e.g., so as not to exceed the breakdown voltage of devices on the tag, e.g., in the rectifier). The power in the RFID mode can also be pulsed, but in such an embodiment, the pulse length is generally longer than in the EAS mode, so that the chip powers up and sends its data before the power decreases to a level disabling the rectifier. The readers in checkout counter applications (e.g., using the RFID mode of the tag) and the readers in retail/security applications (e.g., at an exit of a building, using the EAS mode of the tag) are generally different due to the different operating modes of the inlay (tag).

Sweeping (or varying) the frequency in both of the EAS and RFID modes may be desirable, since doing so dramatically reduces the manufacturing tolerance requirements for the tag. Thus, a single multi-mode tag design (e.g., the tag of FIG. 2) may be used at any frequency within the range of the characteristics of the transistors on the tag, and in EAS mode, the present tag may be detected by sweeping the frequency of a reader and monitoring the current flowing through the reader coil to detect a dip indicative of resonant loading of the reader by the tag. Additionally, a single multi-mode tag design may be used at any frequency within the range of the characteristics of the transistors on the tag. An RFID tag (along with the corresponding reader) may be designed to function at 13.56 MHz, as well as other frequencies. Thus, as explained herein, an exemplary RFID tag designed to function at 13.56 MHz can be tuned or modified to function at 8 MHz.

However, in practice, such tags generally operate at frequencies below 50 MHz, due to certain technological limits. The reader should be designed for a chosen or predetermined frequency (e.g., 13.56 MHz), and the tag may include a divider (e.g., in demodulator/clock function block 130 in FIG. 1) to generate an internal (e.g., on-tag) clock signal. Thus, in one embodiment, a chip designed to provide a 106 KHz clock at 13 MHz applied power can provide a ~65 KHz clock at 8 MHz applied power.

The present tag is not limited, however, to divided clock architectures. For example, at UHF frequencies, the clock may be a modulated signal on the UHF carrier, and may thus be demodulated to obtain the necessary clock signal for the tag (see, e.g., the tag architecture of FIG. 1, which may also be suitable for HF frequencies, depending on the design of the antenna; see e.g., U.S. patent application Ser. Nos. 11/544,366 and 11/595,839, filed on Oct. 6, 2006 and Nov. 8, 2006, respectively). For example, a 200 kHz clock could be modulated onto a 900 MHz carrier signal. The use of a modulated clock would allow the carrier frequency to be changed while keeping the data rate fixed (provided the modulated signal stayed unchanged).

In an alternate embodiment, the clock signal (e.g., the output of demodulator/clock function block 130) could be generated on-chip using a local oscillator, as part of demodulator/clock function block 130 or (at least in part) external to block 130, such as in a crystal oscillator. Such an approach may make the data rate entirely independent of the carrier frequency. Typically, however, such an architecture may be more prone to clock frequency drift. A reader capable of dealing with such drift may take advantage of such an architecture. For example, for a 13.56 MHz carrier, a local oscillator on the tag may generate an 800 kHz clock signal and use this clock frequency for communication purposes.

A mechanism for preserving a high Q in a combination RFID/EAS tag where the EAS mode functions at long ranges (e.g., >10 cm) and the RFID mode functions at short ranges (e.g., <5 cm, where the available power is larger) may include a rectifier on the dual-mode RFID chip which has a moderately high threshold of operational voltage. Thus, in such an embodiment, the dual-mode chip does not draw any significant power as long as the AC voltage on the coil is small (e.g., below a certain or predetermined threshold), thereby preserving the high Q for EAS operation. When the AC voltage on the coil exceeds the threshold (which may be selectable, programmable, tunable, etc.), the chip rectifier turns on, reducing the Q of the multi-mode tag while supplying power to run the RFID mode of the chip. This may be implemented by using a diode chain to control the turn-on threshold of the diode-wired transistors in the rectifier (see, e.g., U.S. Provisional Patent Application No. 60/749,121, filed Dec. 7, 2005, and U.S. patent application Ser. No. 11/521,924, filed Sep. 15, 2006, the relevant portions of which are incorporated herein by reference). Such a design generally uses a diode chain circuit similar to a voltage-controlled shunt.

Figure 4:
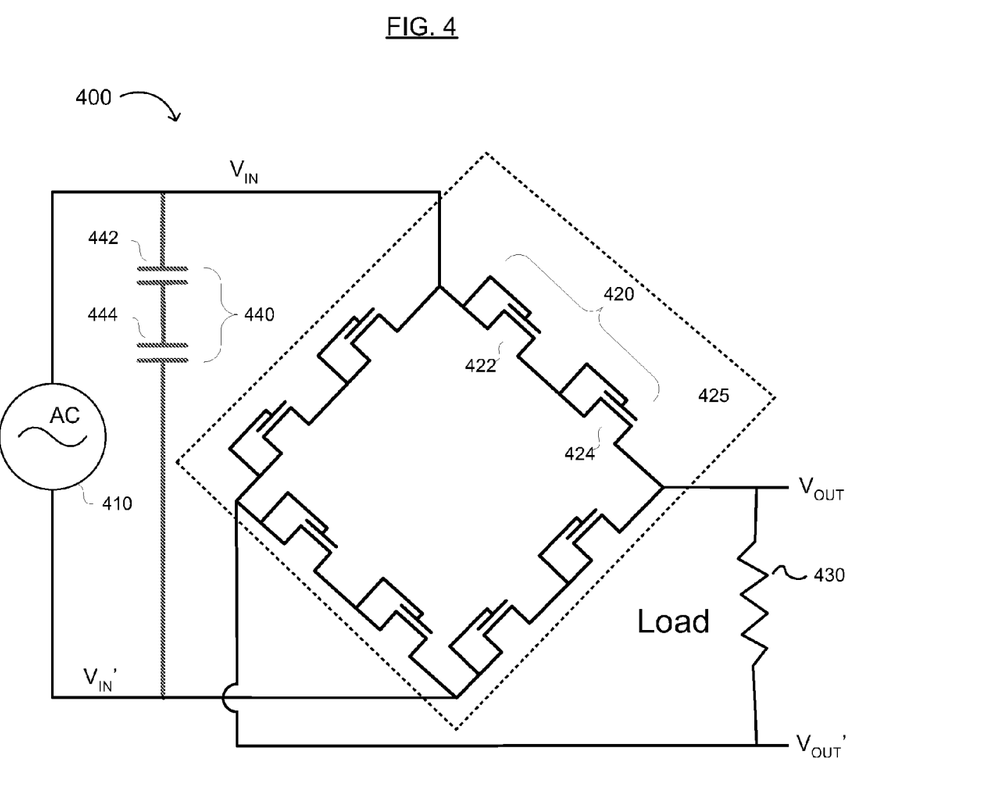
FIG. 4 is a circuit diagram of an exemplary EAS block and rectifier particularly useful in the present multi-mode identification tag.

Extra load in the resonating circuit on the coil side of the rectifier (e.g., 410) generally reduces the Q of the antenna 410. Reduced Q generally means that the tag cannot be easily detected by the EAS reader. However, the tag can still be read by the RFID reader because of the high available power. Advantageously, a programmable threshold device may be placed in a resonating circuit in the rectifier. In the high power operating mode, logic (e.g., logic block 150 in FIG. 1) may program the threshold of a transistor in the rectifier such that it would stay at a low threshold after power is removed. This leaves the tag in a low Q (or unreadable) state for the EAS reader. However, the programmable threshold device in the rectifier can be sized such that the high power of the RFID reader could still supply enough power to communicate with the tag. During this latter type of communication, the logic can be configured to change the threshold to a high value so that the Q is high and the EAS reader can read the tag. In this way, the EAS function can be turned on and off as needed or desired.

An additional variation may include tuning the tag such that when the rectifier is not powered up or operational, the operating frequency may be one value, but then when the tag (or rectifier) powers up, an on-tag capacitance may change to allow it to operate efficiently at a different frequency (see, e.g., U.S. Provisional Patent Application No. 60/592,596, filed Jul. 31, 2004, and U.S. patent application Ser. No. 11/104,375, filed Apr. 11, 2005, the relevant portions of which are incorporated herein by reference).

In an alternative embodiment, detection in EAS mode may be achieved by using the reader to send two separate signals at different frequencies, and exploiting the nonlinearity of the tag to mix the two signals. Detection could be achieved by monitoring for the presence of sidebands on the higher frequency signal sent by the reader (see, e.g., U.S. patent application Ser. No. 11/104,375, filed Apr. 11, 2005, the relevant portions of which are incorporated herein by reference). For example, the reader can send signals at 900 MHz and 100 kHz, and in the presence of a tag, sidebands would be created at 900.1 MHz and 899.9 MHz. In the absence of a tag, no such sidebands exist.

A mechanism for preserving a high Q in a combination RFID/EAS tag where the EAS mode functions at long ranges (e.g., >10 cm) and the RFID mode functions at short ranges (e.g., <5 cm) where the available power is larger, may include a rectifier (see, e.g., the rectifier 425 in the exemplary EAS circuit 400 of FIG. 4) on the dual-mode RFID chip. The rectifier may have a moderately high threshold of operational voltage. Thus, in such an embodiment, the dual-mode chip does not draw significant power as long as the AC voltage on the coil is small (e.g., below a certain or predetermined threshold), thereby preserving the high Q for EAS operation. When the AC voltage on the coil exceeds the threshold (which may be selectable, programmable, tunable, etc.), the chip rectifier turns on, reducing the Q of the combination tag while supplying power to run the RFID mode of the chip. This may be implemented using a diode chain 420 (e.g., series-connected diodes 422 and 424) to control the turn-on threshold of diode-wired transistors in the rectifier 400 (see, e.g., U.S. Provisional Patent Application No. 60/749,121, filed Dec. 7, 2005, and U.S. patent application Ser. No. 11/521,924, filed Sep. 15, 2006, the relevant portions of which are incorporated herein by reference). Such a design uses the diode chain circuit (e.g., series-linked diode chain 420) similarly to a voltage-controlled shunt. Alternatively, the diode-wired transistors (e.g., 422 and 424) may be replaced with true diodes (e.g., Schottky diodes, as disclosed in U.S. Pat. No. 7,152,804, the relevant portions of which are incorporated herein by reference) to reduce the circuit size or to allow the rectifier (and therefore the high-Q/low-Q switching) to operate at higher frequencies (UHF, for example). In further embodiments, one may include more than 2 transistors or diodes (especially if they are Schottky-type diodes rather than diode-wired transistors) in series to control the turn-on threshold of the rectifier 400.

An additional variation may include tuning the tag such that when the rectifier is not powered up or operational, the operating frequency may be one value, but then when the tag (or rectifier) powers up, an on-tag capacitance may change to allow it to operate efficiently at a different frequency (see, e.g., U.S. Provisional Patent Application No. 60/592,596, filed Jul. 31, 2004, and U.S. patent application Ser. No. 11/104,375, filed Apr. 11, 2005, the relevant portions of which are incorporated herein by reference).

Permanently disabling the tag may be accomplished by supplying a very high energy pulse in the RFID reader, such that a device in the tuning/rectifier region of the chip (e.g., one of series capacitors 442 or 444) is severely damaged. Alternatively, if a programmable threshold device having a very low, or even negative, threshold voltage is employed, the EAS tag becomes undetectable (due to the low Q produced by the normally on device) until the programmable threshold device is programmed into a higher threshold voltage state. Thus, a disabled tag (e.g., programmed into a low threshold voltage state) would not normally come back to life over time.

As is taught in U.S. patent application Ser. No. 11/104,375, the relevant portions of which are incorporated herein by reference), two antennae in close proximity can cause either or both of the antennae to act differently than they would independently. Two different antenna on the same inlay (or tag) can be configured or tuned such that each antenna acts as designed to for an intended function (e.g., one antenna for EAS operation[s], a second for RFID operation[s]). In one embodiment, an 8 MHz antenna/fixed capacitor combination may provide the EAS function on the same tag as a 13 MHz antenna connected to the logic circuitry. HF and UHF antennae can also be similarly combined.

Exemplary Methods of Using the Present Multi-Mode Tag

A further aspect of the present invention concerns a method of reading the multi-mode identification tag. For example, the method of reading the tag generally comprises applying an electric field to the tag, detecting the tag when the electric field has a relatively low power, and detecting an identification signal from the tag when the electric field has a relatively high power. In the present method, the electric field is typically generated by a tag reader.

Figure 5:
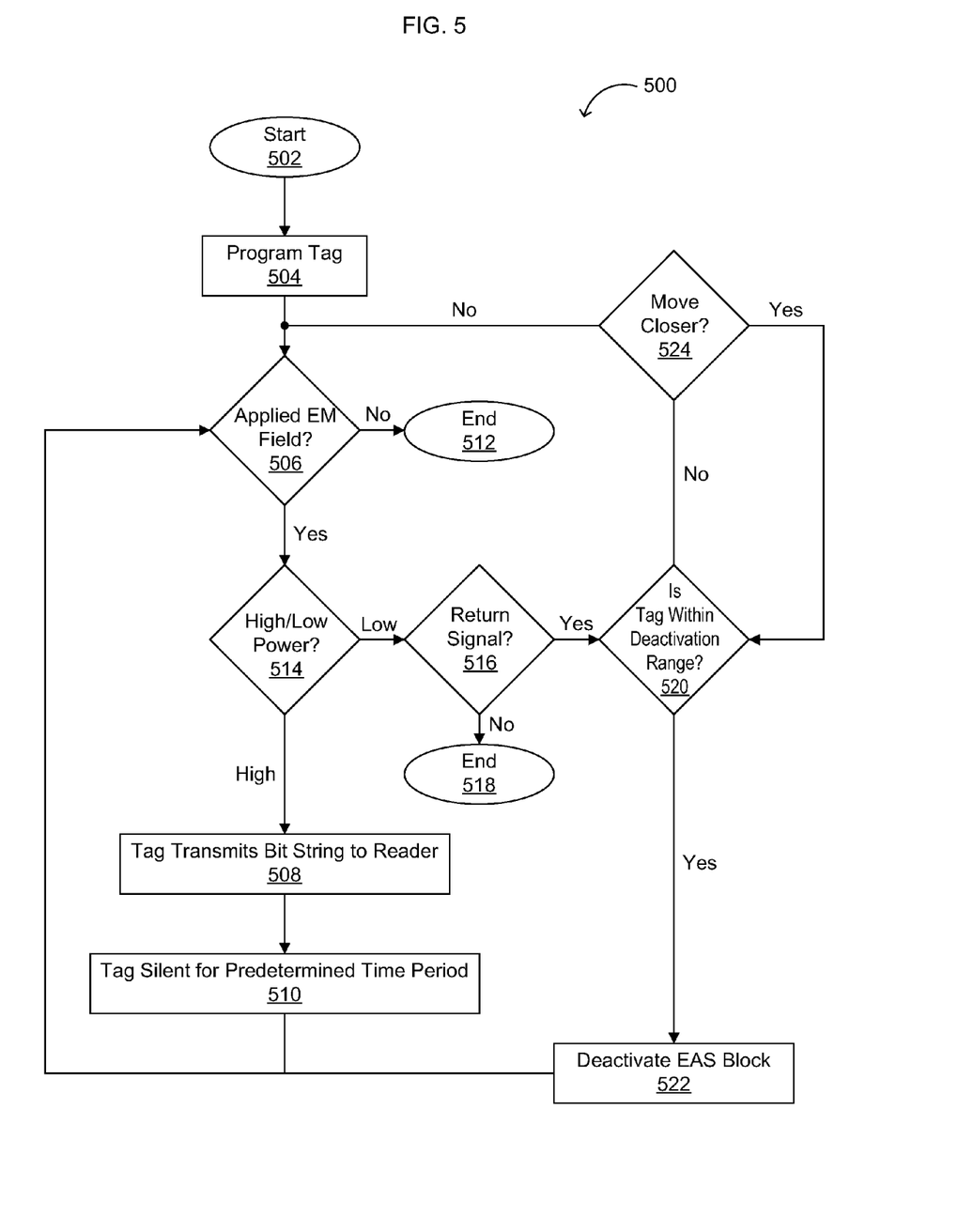
FIG. 5 is a flow diagram of an exemplary process for reading the present multi-mode identification tag, in accordance with the present invention.

FIG. 5 shows one exemplary embodiment 500 for using the present multi-mode tag. The tag may be used for EAS (e.g., anti-theft) operations in one mode, for example, and in identification operations (e.g., RF, HF, VHF or UHF) in another mode. In a preliminary step 504, the identification portion of the tag (e.g., memory 160 in FIG. 1) may be programmed with identification information (e.g., a bit string, which may be unique per se or unique within a predetermined sample or population size). If the tag is in an electromagnetic (EM) field of sufficient strength to activate part or all of the circuitry on the tag (step 506), then the tag will enter one of two modes, depending on a characteristic of the tag or of the EM field. Otherwise, the process ends (512).

In the example of FIG. 5, if the EM field has a relatively high power (e.g., above a first power threshold), then the tag operates in the identification mode. The high power of the EM field causes the Q of the antenna or the tag to have a relatively low value (e.g., below a first Q threshold), but activates the RFID logic circuitry. The tag may transmit the identification information (e.g., a bit string) to the reader in step 508, then in a preferred embodiment, remain silent for a predetermined period of time (using a so-called tags-talk-first, or "TTF," protocol) in step 510. If the information is read by the tag reader, then the tag (or article having the tag affixed thereto) can be removed from the EM field until the tag is reused later.

On the other hand, If the EM field has a relatively low power (e.g., below a second power threshold, which can be the same as or less than the first threshold), then the tag operates in an EAS mode. First, if a return signal is not detected by the reader in step 516, then the EAS portion of the tag has probably been deactivated, and the process can end (518). However, if the reader detects a return signal from the tag in EAS mode, the EAS block of the tag can be deactivated (step 522) on the condition that the tag is within the deactivation range of a deactivation pad associated with the reader (block 520). Thereafter, the tag can still be deactivated if it is moved closer to the pad (see step 524); otherwise, the EAS portion can be used again when the tag (or article having the tag affixed thereto) is moved back into an EM field having sufficient power to cause the tag to return an EAS or identification signal.

Figure 6:
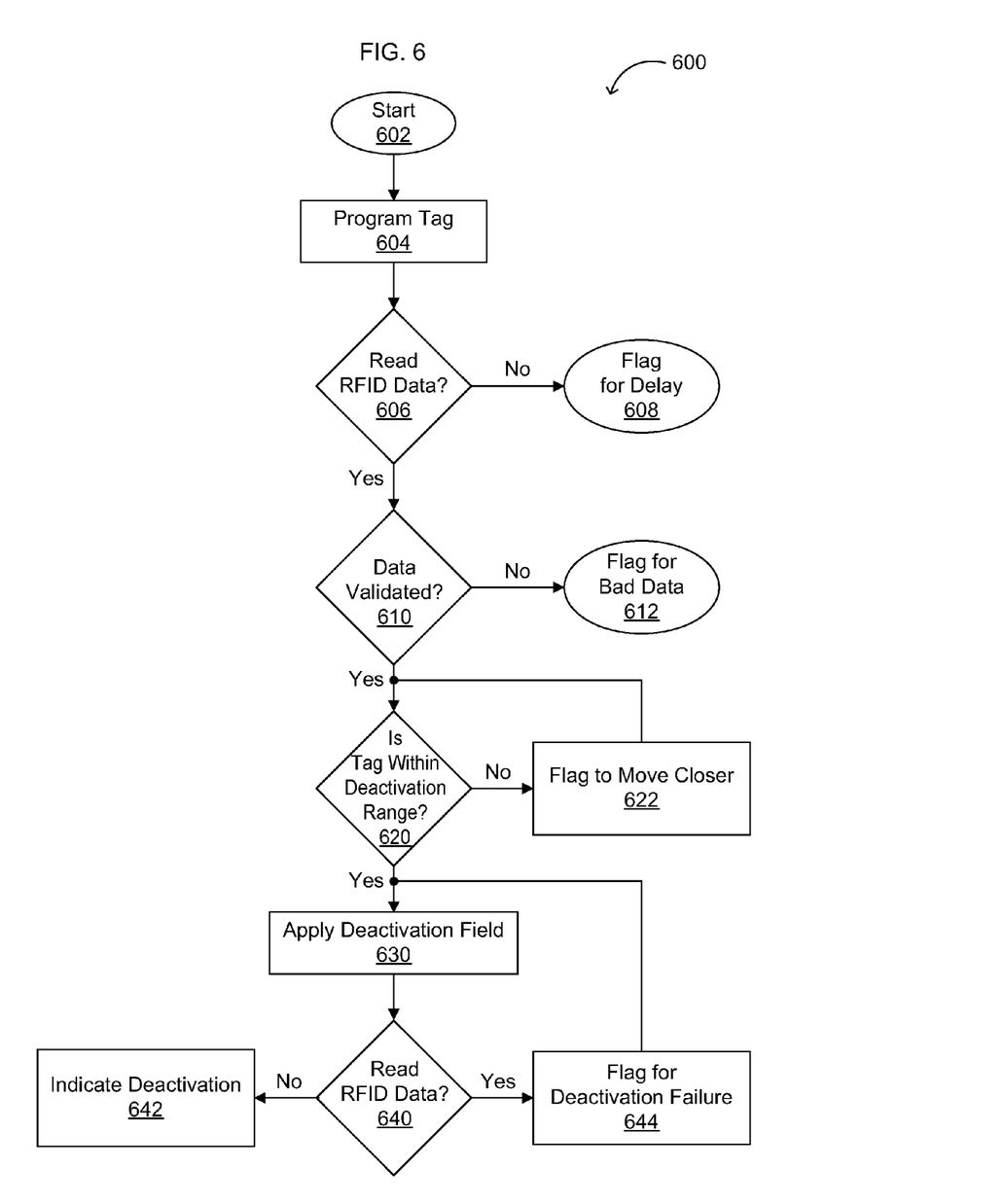
FIG. 6 is a flow diagram of another exemplary process for using the present multi-mode identification tag, in accordance with the present invention.

FIG. 6 shows another exemplary embodiment 600 for using the present multi-mode tag. Like in FIG. 5, identification information may be programmed into the memory (e.g., 160 in FIG. 1) of a multi-mode tag in step 604. If the tag is in an electromagnetic (EM) field of sufficient strength to activate part or all of the RFID circuitry on the tag, then the identification information on the tag can be read in step 606 (FIG. 6). If not, an indicator or flag can be set (e.g., in the reader) to wait a predetermined period of time until a characteristic EAS delay expires (step 608).

In the example of FIG. 6, if the reader reads the identification information on the tag, the reader then attempts to validate the identification information using a database of valid identification information in step 610. In a preferred embodiment, if the data cannot be validated, a flag or indicator indicating that the data may be invalid (such as a light of a particular color [e.g., yellow] or an auditory alarm such as a siren) is set in the reader in step 612. If the information is read and validated by the tag reader, then the tag (or article having the tag affixed thereto) can be removed from the EM field until the tag is reused later, or the EAS portion (e.g., block 120 in FIG. 1) of the tag can be deactivated (e.g., if the article is being purchased or checked out and removed from the secure location in which it was kept, such as a warehouse, retail store, or library).

Like in the example of FIG. 5, if the reader determines that the tag is not within an EAS deactivation range (e.g., a return EAS signal is not detected), in step 522, the reader may activate a flag or indicator that indicates to the user that the tag is not close enough for deactivation. Thereafter, the tag can still be deactivated if it is moved closer to the pad (see step 520). However, if the reader determines that the tag is within the deactivation range (e.g., a return EAS signal is detected), in step 530, an EM field having sufficient power to deactivate the tag (and/or the EAS portion thereon) is applied. The reader then confirms deactivation by attempting to read the identification information on the tag in step 640. If the identification data is read, an indicator (such as a light of a particular color [e.g., red], or an auditory alarm such as a buzzer) indicating that deactivation failed may be triggered or turned on. If the identification data is not read, an indicator (such as a light of a particular color [e.g., green], or an auditory alarm such as a bell) indicating successful deactivation may be triggered or turned on.

The following description explains the operations of a combination RFID/EAS tag that operates in conformance with existing 8.2 MHz EAS systems. The operations fall into two broad categories: operation of the RFID function prior to or at checkout, and EAS deactivation (e.g., at checkout in retail applications) and detection at the sensor.

Exemplary RFID Operations

RFID operations at 8.2 MHz are possible using the multi-mode tag 100. One exemplary RFID block 270 can include or be based on an RFID device having a predetermined number of bits (e.g., 2 or more bits, such as from $m*2^n$, where m and n are independently integers of at least 1, and at least one of m and n is at least 2; in one embodiment, $m*2^n$ is 96 bits) in memory 160 and that may be capable of operating in the 13.56 MHz frequency band. In a preferred embodiment, memory 160 comprises a ROM (e.g., fuse bank, mask-programmable ROM, or EPROM). In some of these embodiments, the functional operation of the RFID block or portion 170 of the tag at 13.56 MHz can be used independent of the multi-mode operations of the device 100.

The exemplary tag 100 may transmit a $((m*2^n)/p)$-bit code, where p is an integer of 1 or more (in one embodiment, 1), on absorbing sufficient power as it enters the reader's 13.56 MHz RF field. A simple TTF (tags talk first) anti-collision scheme can be implemented thereon, which allows several tags in the reader's field to be differentiated (see, e.g., U.S. Provisional Patent Application No. 60/748,973, filed Dec. 7, 2005, and U.S. patent application Ser. No. 11/544,366, filed Oct. 6, 2006, the relevant portions of which are incorporated herein by reference, for an example of such a scheme.

However, rather than attempt to run the RFID at 13.56 MHz and the EAS at 8.2 MHz, the RFID portion may be run at the same frequency as the EAS portion of the tag. The strategy removes the need for separately tuning the RFID and EAS portions of a combination RFID/EAS tag. The reader in such an application is generally configured to read the combined RFID/EAS tag operating at 8.2 MHz.

Although RFID tags are generally designed to operate at 13.56 MHz, the RFID portion 170 of the dual mode tag 100 can be operated at 8.2 MHz simply by retuning the resonant frequency (see, e.g., U.S. patent application Ser. No. 11/104,375, filed Apr. 11, 2005, the relevant portions of which are incorporated herein by reference). Retuning can also be done by changing the antenna inductance and/or the on-chip tuning capacitor value, as disclosed in U.S. patent application Ser. No. 11/104,375.

The exemplary RFID block 170 transmits its data (or code) using a subset of the ISO 14443 Type A air interface specification. The data is transmitted on the 847 KHz sideband at a rate of 106 kbps, using Manchester encoding. Thus, in one embodiment, transmission of 96 bits takes approximately 0.9 milliseconds. The same transmission protocol can be used at 8.2 MHz, with appropriate scaling of the sub-carrier frequency and data rate.

Power Availability at 8.2 MHz

The Federal Communications Commission (FCC) limits the magnetic field strength provided by the carrier at 8.2 MHz to only 1% of that at 13.56 MHz (i.e., 0.1 mV/m at 30 m for 8.2 MHz, vs. 10 mV/m at 30 m for 13.56 MHz). Converting this to a near-field magnetic field, the maximum permissible field strength at 3 cm would be about 10 A/m at 8.2 MHz, but 365 A/m at 13.56 MHz. However, by pulsing the 8.2 MHz carrier at a 10× peak power and a 10% duty cycle, short bursts (e.g., a maximum pulse length of about 12 nsec or less) can reach 100 A/m. Equivalent pulse lengths and power increases can be easily determined by one skilled in the art, in accordance with design and/or application choices.

At 13.56 MHz, the exemplary tag 100 can operate in the RFID made at a range of up to 4 cm from a conventional reader, requiring a magnetic field of approximately 15 A/m to power the RFID block 170 of the tag 100. While this requirement exceeds the average power of 10 A/m available at 8.2 MHz, it falls well within the power available from a pulsed power source operating at a 10× X peak power and 10% duty cycle. In addition, the power consumption of the exemplary tag 100 will be lower for 8.2 MHz operation than for 13.56 MHz operation due to the lower dynamic power consumed at the reduced operating frequency.

Exemplary EAS Functionality

Combining the exemplary RFID block 170 with technology compatible with existing 8.2 MHz EAS systems, without affecting existing EAS system operation, presents two hurdles for the present dual-mode tag 100. First, the RFID portion 170 of the RFID/EAS tag 100 must be readable (e.g., at retail checkouts) without interfering with EAS deactivation or causing inadvertent deactivation. Second, the functionality of RFID block 170 should not interfere with EAS detection; i.e., RFID functionality should operate orthogonally to the EAS function(s) 120.

The exemplary RFID tag requires approximately 10, 12, 14 or more volts AC to be generated on the coil (e.g., across the Coil1/Coil2 terminals) to function correctly. This voltage may be too high for the capacitor on a conventional EAS tag.

For example, the capacitor on one exemplary EAS tag might undesirably fail or deactivate during a typical read operation of the RFID portion. However, the EAS portion 120 should deactivate when a higher voltage is applied to it. As a result, an "on-chip" capacitor (e.g., integrated with the RFID circuitry 170 on a single substrate) may be used for both deactivation of the EAS block 120 (e.g., a capacitor therein) and/or for tuning the resonance of tag 100 to another frequency (e.g., 8.2 MHz), removing the need for a separate EAS tag capacitor. Using existing systems (with minor modification[s] as discussed herein), power should be available to rupture (or short-circuit) the on-chip capacitor in EAS block 120, even though it takes a voltage higher than that for operation of the RFID block 170.

Intentional deactivation of the EAS block 120 is relatively facile in the present scheme. The on-chip capacitor in the EAS block 120 of the exemplary tag 100 can undergo irreversible breakdown upon application of a voltage of approximately 30-40 volts, for no more than about one millisecond, to induce tag deactivation. This voltage can readily be achieved on an LC tag in close proximity to an EAS tag deactivation pad using current technology.

Using an LC circuit containing a load resistance representative of a preferred impedance of the exemplary RFID block 170, a potential of 40 V can be obtained on the coil at a range of at least 1.5 cm from the EAS deactivation pad. Although this range is shorter than the operating range of the RFID block 170 (e.g., about 3-4 cm), the deactivation range is close to the RFID range, and further optimization may improve the EAS deactivation range. Alternatively or additionally, altering the deactivation pulses provided by the deactivation pad may improve the deactivation range.

EAS tag detection within the desired range requires that the LC circuit have a fairly high Q, in the range of about 60. In a preliminary experiment, the exemplary dual-mode tag 100 has been tuned to operate at 8.2 MHz, and the Q of the tag was measured. The Q measured for the dual-mode tag 100 is approximately 30% of the Q measured for a conventional EAS tag. Although the Q of the exemplary dual-mode tag 100 is lower than what might be desired for optimal operations, improvements to the exemplary RFID tag have been identified herein that should allow a significant improvement in the dual-mode tag's Q value, making it compatible with EAS systems.

A Second Exemplary Multi-Mode Tag

Figure 2:
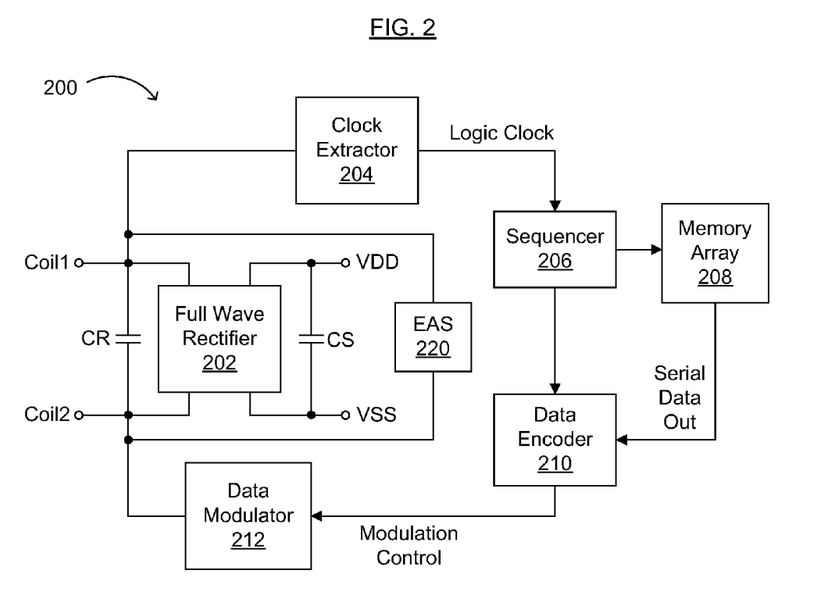
FIG. 2 is a block diagram showing a second embodiment of the present multi-mode identification tag, including a rectifier.

FIG. 2 shows a second exemplary embodiment of a dual-mode tag architecture 200 suitable for use in the present invention. As for the embodiment of FIG. 1, the dual-mode tag 200 includes an antenna (not shown, but represented by the Coil1/Coil2 terminals), an EAS function block 220, a full wave rectifier 202, and an RFID portion 270 (described in U.S. patent application Ser. Nos. 11/521,924, 11/544,366 and 11/595,839, filed on Sep. 15, 2006, Oct. 6, 2006 and Nov. 8, 2006, respectively, the relevant portions of which are incorporated herein by reference). Also similarly to FIG. 1, the EAS function block 220 is coupled to the antenna (or across terminals thereto) in parallel with RFID portion 270 and/or full wave rectifier 202.

In the embodiment of FIG. 2, an electromagnetic field can be induced on an external coil attached at terminals Coil1 and Coil2 and across capacitor CR. The AC voltage across the coil can be rectified by full wave rectifier 202 receives the sinusoidal (e.g., alternating or periodic) signal from the antenna, and provides (i) a DC power supply across terminals VDD and VSS and (ii) a supply capacitance, CS. Capacitors CR and CS (which may be on-tag, off-tag, or both [e.g., CS is on-tag and CR is off-tag]) may function to filter the signals to and from the antenna and/or to reduce noise on the power supply lines. In one implementation, the full wave rectifier 202 may be implemented as rectifier 425 of FIG. 4.

Referring back to FIG. 2, the RFID portion may comprise clock extractor 204, sequencer 206, memory array 208, data encoder 210, and data modulator 212. Clock extractor 204 may produce a logic clock for sequencer 206, and memory array 208 can be accessed by signals generated from sequencer 206 to provide a serial data output to data encoder 210. In various embodiments, memory 208 may comprise volatile (e.g., DRAM, SRAM, etc.) or non-volatile memory (e.g., mask ROM, one-time programmable [OTP] ROM such as fuses or EPROM, EEPROM, ferromagnetic RAM [FRAM], etc.), and memory 208 can store a bit string (which can be unique or have one of a predetermined number of values providing a substantially unique value for a given tag population or sample size) associated with identification information and/or a security or encryption key.

Modulation control can be generated from data encoder 210 and provided to data modulator 212 for output of an RF reply signal to the reader. Thus, the encoder may comprise logic that converts data from the memory 208 to signals configured to control the data modulator and/or encode the data in the RF transmission signal.

The EAS function block 220 generally comprises one or more capacitors having a characteristic breakdown voltage. When EAS function block 220 comprises more than one capacitor, at least two of the capacitors are typically (but not necessarily) in series with each other (see, e.g., capacitor circuit 440 in FIG. 4). The breakdown voltage of the EAS capacitor(s) is generally significantly higher than VDD, usually by 2-3× or more. For example, VDD can be anywhere from about 1.5 V to about 9 V (e.g., 1.8 V, 2.5 V, 3.3 V, 5 V, etc.), but the EAS capacitor breakdown voltage is generally at least 10 V, and possibly up to 30 or 40 V (e.g., about 12 V, 15 V, 20 V, 25 V, etc.).

Third and Fourth Exemplary Multi-Mode Tags

Figure 3A:
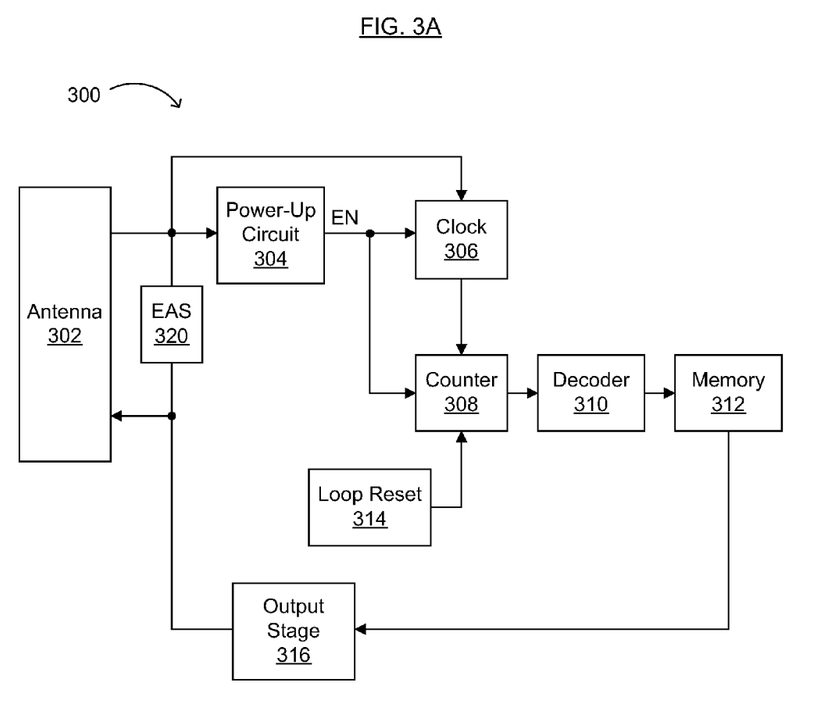
FIG. 3A is a block diagram showing a third embodiment of the present multi-mode identification tag, configured for a counter-based identification process.
Figure 3B:
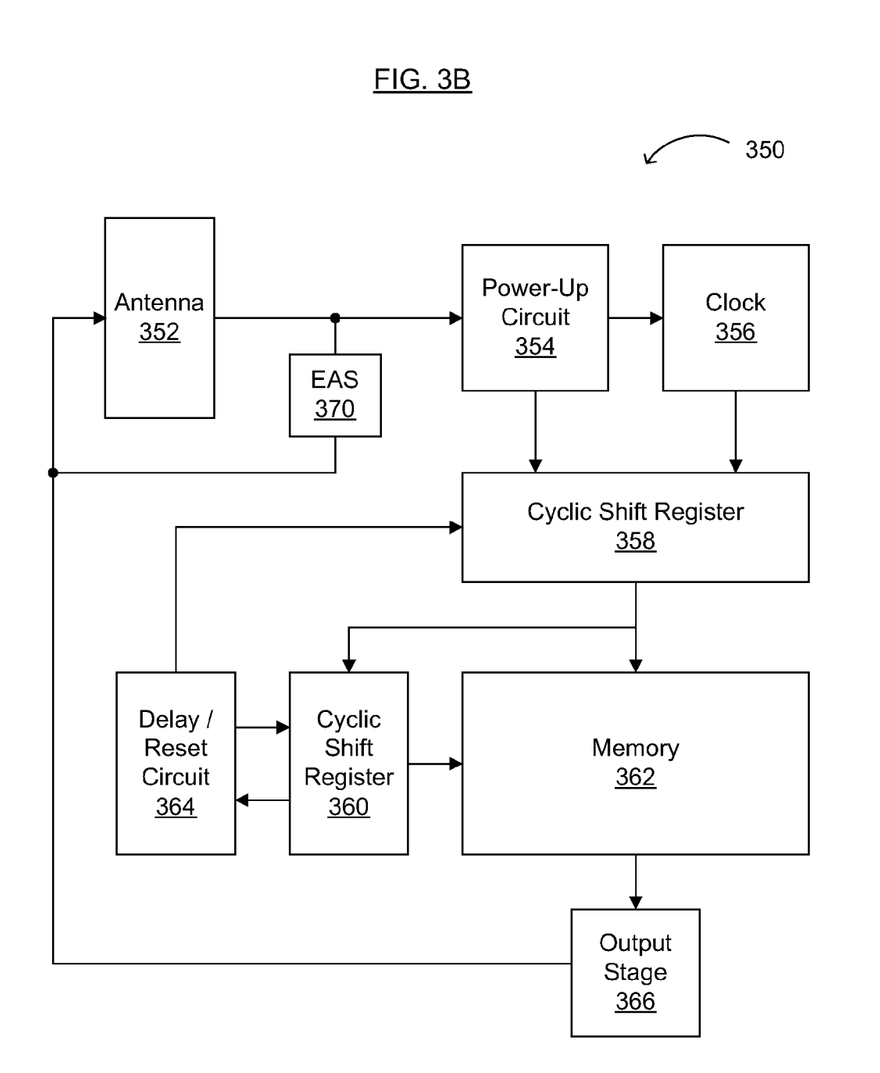
FIG. 3B is a block diagram showing a fourth embodiment of the present multi-mode identification tag, configured for a shift register-based identification process.

FIGS. 3A-3B show exemplary embodiments of dual-mode tag architectures, the RFID portion(s) of which are described in U.S. patent application Ser. Nos. 11/544,366 and 11/595,839, filed on Oct. 6, 2006 and Nov. 8, 2006, respectively, the relevant portions of which are incorporated herein by reference. These dual-mode architectures further include an EAS function block 320 (FIG. 3A) or 370 (FIG. 3B) coupled to the antenna 302 (FIG. 3A) or 352 (FIG. 3B) or across terminals thereto. The EAS function block 320 or 370 may comprise a linear and/or non-linear capacitor, as described in U.S. Pat. No. 7,152,804 and/or U.S. patent application Ser. No. 11/104,375, filed Apr. 11, 2005, the relevant portions of which are incorporated herein by reference, and function similarly to EAS function block 120/220 above (see also FIGS. 1-2).

In general, an RFID portion of a third embodiment of the dual-mode tag 300 can include an antenna section (e.g., 302), a power-up circuit (e.g., 304), a clock subcircuit (e.g., 306), a counter (e.g., 308), a memory portion (e.g., 312), a decoder (e.g., 310), a loop reset circuit (e.g., 314), and an output stage (e.g., 316). Portions of or all such circuit portions (except, in some embodiments, the antenna 302) can be printable in order to reduce overall system costs.

The antenna 302 may be implemented using a resonant LC circuit for use at 13.56 MHz, for example, but tunable for use at, e.g., 8.2 MHz (i.e., at a frequency typical of EAS applications). Alternatively, the antenna may be implemented using a dipole or similar such antenna for 900 MHz (high frequency, or HF) operation or 2.4 GHz (very high frequency, or VHF) operation. Generally, the antenna may be used to provide power for operation of the tag circuitry, and to provide information from the tag to the reader or interrogator. Using power-up circuit 304, power can be extracted by rectifying the RF signal collected by antenna 302 and storing the resultant charge in a storage capacitor (e.g., CS). Thus, when a tag enters a region of space with sufficient electromagnetic field being transmitted from a nearby reader, the capacitor begins to charge-up, and a voltage across the capacitor increases accordingly. When the voltage reaches a sufficient value, an "enable" signal can be generated, and this enable signal (e.g., EN) can be used to initiate circuit operation (e.g., by coupling to clock 306 and counter 308).

In an exemplary clocking subcircuit (e.g., 306), a clock signal can be generated so as to synchronously operate associated circuitry (e.g., usually counter 308, but in some embodiments, also memory 312 and/or output stage 316). As for other embodiments of the dual-mode tag, this clock signal may be generated by dividing down the incident RF signal received by antenna 302, by generating a local clock signal using an on-chip oscillator, or by demodulating a reader-provided clock signal from the received RF signal. This clock signal may be used to drive counter 308, which may begin counting from a reset state as soon as tag circuitry 300 is enabled, for example by a reduction in the Q value of the antenna 302 or tag 300.

As values of counter 308 increase, a counter output can be used to sequentially select specific bits in memory portion 312. Such a memory array may be customized using a maskless process technology (e.g., a printing process) for 1, 2, or more layers of the tag. In an alternative embodiment, memory bits forming memory 312 may be made using conventional photolithographic techniques, and outputs thereof can be connected using maskless processing (e.g., one or more printing and/or laser writing/definition processes) to create standard or customized bit sequences.

Bits provided from memory 312 in the dual-mode tag or device 300 may be passed to output stage 316 for information transfer back to a reader (e.g., in the form of a bit string). The information transfer can be accomplished by modulation of the tag impedance, for example. Alternatively, other common modulation schemes, such as amplitude shift keying and/or frequency shift keying may also be used in accordance with embodiments of the present invention.

In operation, as counter 308 goes through its counting sequence, various bits or portions of a predefined bit string can be transferred back to the reader. Simultaneously, loop reset 314 can monitor the state of counter 308. After a complete bit string of appropriate length is sent back to the reader, tag 300 can "go silent" and remain in this silent state until the counter state reaches a specific value. Loop reset 314 can then compare the counter value with a value that may be programmed during tag fabrication using laser fuses or printed OTP memory, for example. When the counter value and the programmed value are logically equal (e.g., each bit of each value matches), loop reset circuit 314 can reset counter 308, and the overall process can be repeated.

FIG. 3B shows an exemplary block schematic diagram 350 including an antenna section (e.g., 352), EAS function block 370, a power-up circuit (e.g., 354), a clock subcircuit (e.g., 356), cyclic shift registers (e.g., 358 and 360), a memory portion (e.g., 362), a delay/reset circuit (e.g., 364), and an output stage (e.g., 366). Portions of or all such circuit portions can be printable in order to reduce overall system costs. Other than antenna 352 and EAS function block 370, the RFID function block may comprise one or more of the remaining blocks. Preferably, the RFID function block comprises at least power-up circuit 354, clock subcircuit 356, a cyclic shift register (e.g., 358 or 360), memory 362, and output stage 366.

The antenna may be implemented similarly to the antenna of other embodiments. Power-up circuit 354 can rectify the RF signal collected by antenna 352 and store the resultant charge in a storage capacitor. The "enable" signal (e.g., EN) can be generated and used to initiate circuit operation (e.g., by coupling to clock 356, cyclic shift registers 358 and 360, and the delay/reset circuit 364). Clocking subcircuit 356 can generate a clock signal so as to synchronously operate associated circuitry (e.g., cyclic shift registers 358 and 360, memory 362, and/or output stage 366). This clock signal may be generated similarly to other embodiments described herein. When the clock signal drives cyclic shift register 358, a single predetermined state (e.g., a binary "high" bit) may be shifted through all the rows addressing the memory, thus selecting one row of memory at a time. The output of 358 may in turn be used to clock a second cyclic shift register 360, thus shifting a single high bit through all the columns addressing the memory 362, thus selecting a single column of memory at a time. The memory array 362 may be customized using a maskless process technology (e.g., a printing process), as described above, for 1, 2, or more layers of the tag. The output stage 366 may also function similarly to other output stages or sections described herein.

In operation, as cyclic shift registers 358 and 360 go through a shiftable sequence, various bits or portions of a predefined bit string can be transferred back to the reader. At the end of the sequence, the delay/reset circuit 364 can be triggered by the output of 360 to cause tag 350 to "go silent" and remain in this silent state for an interval determined by the delay/reset circuit 364. The delay may be a predetermined value, or may be determined based on various environmental or physical parameters such as temperature, power delivered to the tag, and/or electrical performance of various components within the delay circuit. When the delay circuit completes its cycle, it can reset shift registers 358 and 360, and the overall process can be repeated.

In the embodiments of FIGS. 3A-3B, within a certain/predefined period of time (e.g., 1 second), a certain number (e.g., X) tags can broadcast and be read/distinguished by conventional RFID and/or EAS systems and/or technology. "X" can be an integer of, e.g., 10, 12, 20, or more devices. Further, additional technological advances, as well as an increased number of bits in the bit string, can allow $2^N$ tags or devices to be distinguished when broadcasting. "N" can be an integer of 5, 8, 10, or more, for example.

In addition, in the embodiments of FIGS. 3A-3B, one can use a unique tag identification number as a mechanism for generating corresponding unique delays for each tag or device by providing these as inputs to the delay/reset circuit. Conventional software and/or algorithmic approaches can be used to convert each unique tag identification number into a bit sequence of a different length. For example, bit sequence lengths can range from 7 to 16, and can result in sufficient differentiation in terms of delays between two random tags or devices. Accordingly, any two tags 300/350 under an applied set of detection conditions can be distinguished due to different bit sequences resulting from unique tag identification numbers (e.g., values and/or lengths) programmed therein.

An Exemplary EAS Block for Multi-Mode Tags

FIG. 4 shows an exemplary EAS block 400 for use in the present multi-mode tags. EAS block 400 may include a rectifier 425 and a capacitor block 440. In one embodiment, capacitor block 440 comprises series capacitors 442 and 444, which receive the external signal (e.g., an 8.2 MHz RF/EAS signal) from antenna 410 and which are configured to provide the EAS deactivation function. Bridge rectifier 425 may comprise four series-connected diode pairs (e.g., 420, comprising first diode 422 and second diode 424; see, e.g., U.S. patent application Ser. No. 11/521,924, filed Sep. 15, 2006, the relevant portions of which are incorporated herein by reference) as shown in FIG. 4. Alternatively, the rectifier may comprise a half-wave rectifier (e.g., diode pair 420) or a full-wave rectifier (e.g., two series-connected diode pairs, such as diode pair 420 and its complement between Vin' and Vout). Series-connected devices such as diodes 422 and 424 and capacitors 442 and 444, and methods of making the same, are described in U.S. Provisional Patent Application No. 60/859,480, filed Nov. 15, 2006, the relevant portions of which are incorporated herein by reference. Load 430 across power supply $V_{OUT}/V_{OUT}$ generally comprises a conventional load resistor.

In FIG. 4, capacitor block 440 may provide the EAS function when it has an appropriate breakdown voltage (e.g., in the range of ~10 to 40 V; e.g., from about 10 to about 20 V, from about 20 to about 30 V, from about 30 to about 40 V, or any range of values therein; see, e.g., U.S. Pat. No. 7,152,804). Capacitors formed in series may consume about the same area in the EAS block 400 as a single capacitor having a thicker oxide, but the voltage is divided between two capacitors 442 and 444, instead of having the entire voltage drop across just one capacitor. This makes the capacitor circuit much less "leaky," and is expected to result in higher yields in manufacturing. Additionally, one could advantageously use the same oxide layer for both the tank capacitors 442/444 and the rectifier transistors (e.g., 422 and 424), which may also increase the transistor performance by reducing the turn-on voltage. This embodiment provides process simplicity while optimizing the performance of both components.

Rectifier 425 may be configured to have one or more of the dual-mode characteristics and/or provide one or more of the dual-mode functions described herein. Furthermore, series-connected diodes 422 and 424 may be configured to divide the voltage equally between the two devices, thereby rendering the peak stress on the gate oxide in the devices 422 and 424 similar to the stress on the other logic transistors (e.g., in logic block 150 in FIG. 1) and possibly increasing rectifier efficiency. The diodes 422 and 424 can be made using the same manufacturing process as the logic transistors, thereby simplifying the manufacturing technology and increasing product throughput (e.g., reducing the total time of manufacturing).

An Exemplary Method of Making a Multi-Mode Tag

A further aspect of the invention relates to a method of making the present multi-mode (e.g., dual-use) tag. Advantageously, the present tag may be manufactured using printing technology, rather than photolithography. Such a manufacturing approach minimizes waste of materials and increases throughput, relative to photolithographic processes. Suitable printing processes for forming patterned layers of (doped) silicon, metal, and insulator can be found in U.S. Pat. No. 7,152,804 and and U.S. patent application Ser. Nos. 11/243,460, 11/104,375, 11/452,108, filed Oct. 3, 2004, Apr. 5, 2005, Jun. 12, 2006, Oct. 6, 2006, respectively, the relevant portions of each of which is incorporated by reference herein.

However, the method is not limited to techniques for printing electronic devices (e.g., devices with one or more printed layers or structures). The method can also be implemented equally well using fabrication techniques commonly associated with circuits on single crystal substrates (e.g., CMOS circuits on silicon wafers). In one embodiment, for example, load resistors may be placed in the single crystal circuit to provide it with one or more characteristics similar to or the same as the printed circuit.

One technique that can be used in either case involves configuring the rectifier (e.g., 425 in FIG. 4) to have a high threshold voltage and the rest of the circuit to have a lower threshold voltage. In such a case, the rectifier turns on only under high power (e.g., in the presence of a relatively high applied electric field, such as that found in close proximity to a reader). In addition, the operating power to run the rest of the logic stays low due to the lower threshold voltages of the transistors (and other devices) in such logic. In devices on a single crystal substrate, this may be done by using different threshold voltage implants in each of the functional block areas (i.e., the rectifier area 202 vs. the RF logic areas 204-212 in FIG. 2). In the case of printed devices, the threshold of the devices may be varied by adding dopant(s) to the ink(s) such that ink(s) with different doping (or dopant) levels therein are printed (e.g., by inkjetting or offset lithography) in the different areas. Higher doping typically increases the threshold, and lower doping decreases the threshold.

Working Example

An existing 13 MHz tag, connected to an antenna tuned to 8 MHz, can function as an RFID tag close to a reader and as an EAS tag at a distance from the reader, as demonstrated by simulation as well as by measurements taken on RFID tag circuitry designed for operation at 13.56 MHz, but tested at 8 MHz. A rectifier circuit with a voltage-controlled turn-on has been designed (see, e.g., U.S. patent application Ser. No. 11/521,924) and fabricated using Si ink technology (see, e.g., U.S. patent application Ser. Nos. 10/789,317, 10/949,013, 10/950,373, and 10/956,714, filed on Feb. 27, 2004, Sep. 24, 2004, Sep. 24, 2004, and Oct. 1, 2004 respectively and an externally attached capacitor. The rectifier circuit is configured to prevent the RFID circuitry from affecting the EAS operation at a distance. The 8.2 MHz EAS mode antenna resonated strongly enough to be detected by a commercially available EAS reader (from Checkpoint Systems), and it also showed that bits in a programmed memory are clocked out when the tag is in a higher field region (e.g., representative of or simulating an RFID field). The RFID circuitry did not affect the EAS operation at a distance.

In an alternative and/or complementary approach, simulations have shown that existing 13 MHz RFID tags, connected to an antenna tuned to 8 MHz, can function as an RFID tag close to a reader and as an EAS tag at a farther distance from the reader.

The calculations and experimental data summarized herein demonstrate the design and production of a combination (dual mode) RFID/EAS tag, compatible with existing EAS and RFID systems, from existing RFID and EAS devices and technology. Further moderate alterations and improvements to existing technology may lead to commercially viable dual mode systems. In particular, modifying an exemplary RFID tag to operate at 8.2 MHz, and using the RFID on-chip tuning capacitor to provide EAS functionality, allows interoperations with existing sensors/readers. The EAS deactivation range in such a system corresponds to the operating range for the RFID portion, which would be several centimeters.

CONCLUSION/SUMMARY

Thus, the present invention provides a multi-mode identification tag and methods for making and reading the same. The tag generally comprises an antenna, an electronic article surveillance (EAS) function block coupled to the antenna, and one or more RFID function blocks coupled to the antenna in parallel with the EAS function block. The method of reading an identification tag generally comprises applying an electric field to the tag, detecting the tag when the electric field has a relatively low power, and detecting an identification signal from the tag when the electric field has a relatively high power. In the present method, the electric field is typically generated by a tag reader. Thus, embodiments of the present invention advantageously provide the tag with both an EAS function and a RFID function. Thus, the tag is useful as an RFID tag, at least before the EAS function is disabled. As a result, manufacturers, wholesalers, distributors and retailers can use a single tag for RF and EAS functions, thereby simplifying product and inventory management and potentially reducing the costs of performing and/or providing both functions.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A multi-mode identification tag, comprising:
   a) an antenna;
   b) an electronic article surveillance (EAS) function block coupled to the antenna;
   c) one or more RFID function blocks coupled to the antenna in parallel with the EAS function block; and
   d) a rectifier configured to become (i) substantially disabled in an electric field having an energy below a first predetermined threshold and (ii) substantially enabled when the energy of the electric field is above a second predetermined threshold, the second threshold being greater than or equal to the first threshold;
   wherein (i) the tag has a high Q state in the electric field having an energy below the first predetermined threshold, and (ii) the tag has a low Q state in the electric field having an energy above the second predetermined threshold.

2. The multi-mode identification tag of claim 1, wherein the rectifier is coupled to the antenna in parallel with the EAS function block.

3. The multi-mode identification tag of claim 1, wherein the rectifier is coupled to the antenna in parallel with the EAS function block, and the rectifier is substantially non-operational or disabled when the tag has the high Q state, and the rectifier is operational or enabled when the tag has the low Q state.

4. The multi-mode identification tag of claim 1, wherein the RFID function block(s) are substantially non-operational, disabled or electrically disconnected from a power supply when the tag has the high Q state, and the RFID function block(s) are substantially operational, enabled or electrically connected to the power supply when the tag has the low Q state.

5. The multi-mode identification tag of claim 4, wherein when the tag is in the low Q state, the tag is unreadable and the EAS function is non-operational.

6. The multi-mode identification tag of claim 1, wherein when the electric field has a power above the first predetermined threshold, a sufficient number of the RFID function block(s) are enabled or electrically connected to the power supply to lower the Q of the tag to the low Q state.

7. The multi-mode identification tag of claim 6, wherein when the power of the electric field is below the second predetermined threshold, a sufficient number of the RFID function block(s) are disabled or electrically disconnected from the power supply to maintain the Q of the tag in the high Q state.

8. The multi-mode identification tag of claim 1, wherein the rectifier has a resonating circuit with a load effective to reduce the Q of the tag.

9. The multi-mode identification tag of claim 8, wherein the resonating circuit includes a programmable threshold device.

10. The multi-mode identification tag of claim 9, wherein the programmable threshold device comprises a thin film transistor.

11. The multi-mode identification tag of claim 10, wherein the thin film transistor has a threshold sufficiently low to maintain the tag in a low Q state until the tag is removed from the electric field.

12. The multi-mode identification tag of claim 10, wherein the tag includes logic configured to change the threshold of the thin film transistor to a relatively high value so that the antenna enters a high Q state.

13. The multi-mode identification tag of claim 1, wherein the rectifier receives a signal having a characteristic frequency from the antenna and provides upper and lower power supplies to the RFID function block(s).

14. The multi-mode identification tag of claim 1, wherein the RFID function block(s) comprise a demodulator or clock extractor configured to receive a signal from the antenna and provide a clock signal to remaining RFID function block(s) in response thereto.

15. The multi-mode identification tag of claim 14, wherein the RFID function block(s) further comprise logic configured to receive the clock signal from the demodulator or clock extractor and provide an identification signal in response thereto.

16. The multi-mode identification tag of claim 15, wherein the logic comprises a memory storing a bit string, and the identification signal comprises the bit string.

17. The multi-mode identification tag of claim 16, wherein the logic is configured to silence the tag for a period of time and re-transmit the bit string thereafter.

18. The multi-mode identification tag of claim 15, wherein the RFID function block(s) further comprise a modulator or output stage configured to transmit the identification signal or a modulated identification signal to the antenna.

19. The multi-mode identification tag of claim 1, wherein the EAS function block comprises a capacitor.

20. The multi-mode identification tag of claim 19, wherein the capacitor has a predetermined breakdown voltage.

21. The multi-mode identification tag of claim 1, wherein the antenna comprises a coil and a tuning element.

22. The multi-mode identification tag of claim 21, wherein the tuning element comprises a second coil, a capacitor or capacitor plate, or a tuning ring.

23. The multi-mode identification tag of claim 1, wherein the EAS function block comprises a capacitor.

24. The multi-mode identification tag of claim 23, wherein the capacitor has a characteristic breakdown voltage in the range from about 10 to about 40 V.

25. A method of reading an identification tag, comprising:
   a) applying an electric field to the tag, wherein (i) the tag has a high Q state in an electric field having an energy below a first predetermined threshold, and (ii) the tag has a low Q state in an electric field having an energy above a second predetermined threshold, the tag further having a rectifier configured to become (i) substantially disabled when the electric field has an energy below the first predetermined threshold and (ii) substantially enabled when the energy of the electric field is above the second predetermined threshold, the second threshold being greater than or equal to the first threshold;

b) detecting the tag when the energy of the electric field is below the first threshold and the tag has the high Q state; and c) detecting an identification signal from the tag when the energy of the electric field is above the second threshold and the tag has the low Q state.

26. The method of claim 25, wherein the tag comprises one or more RFID function block(s) that are substantially non-operational, disabled or electrically disconnected from a power supply when the tag has the high Q state, and the RFID function block(s) are substantially operational, enabled or electrically connected to the power supply when the tag has the low Q state.

27. The method of claim 26, wherein when the energy of the electric field is above the second predetermined threshold, a sufficient number of the RFID function block(s) are enabled or electrically connected to the power supply to lower the Q of the tag to the low Q state.

28. The method of claim 27, wherein when the energy of the electric field is below the first predetermined threshold, a sufficient number of the RFID function block(s) are disabled or electrically disconnected from the power supply to maintain the Q of the tag in the high Q state.

29. The method of claim 25, wherein the programmable threshold device comprises a thin film transistor having a threshold sufficiently low to maintain the tag in a low Q state until the tag is removed from the electric field.

30. The method of claim 29, wherein the tag includes logic configured to change the threshold of the thin film transistor to a relatively high value so that the antenna enters a high Q state.

* * * * *